(12) United States Patent
Redlich et al.

(10) Patent No.: US 11,991,101 B2
(45) Date of Patent: May 21, 2024

(54) USING ENHANCED SIGNAL SPECTRAL TX MASK FOR IMPROVED MULTI-USER GROUPING AND INCREASED SPECTRAL EFFICIENCY

(71) Applicant: Huawei Technologies Co., Ltd., Shenzhen (CN)

(72) Inventors: Oded Redlich, Hod Hasharon (IL); Shimon Shilo, Hod Hasharon (IL); Avi Weitzman, Hod Hasharon (IL); Genadiy Tsodik, Hod Hasharon (IL); Doron Ezri, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 557 days.

(21) Appl. No.: 17/189,876

(22) Filed: Mar. 2, 2021

(65) Prior Publication Data

US 2021/0203458 A1  Jul. 1, 2021

Related U.S. Application Data

(63) Continuation of application No. PCT/EP2018/073740, filed on Sep. 4, 2018.

(51) Int. Cl.
| | |
|---|---|
| *H04L 5/00* | (2006.01) |
| *H04W 72/0453* | (2023.01) |
| *H04W 72/23* | (2023.01) |
| *H04W 72/51* | (2023.01) |

(52) U.S. Cl.
CPC .......... *H04L 5/0037* (2013.01); *H04L 5/0062* (2013.01); *H04W 72/0453* (2013.01); *H04W 72/23* (2023.01); *H04W 72/51* (2023.01)

(58) Field of Classification Search
CPC .... H04W 72/23; H04L 5/0062; H04L 5/0094; H04L 5/001
See application file for complete search history.

(56) References Cited

U.S. PATENT DOCUMENTS

| | | | |
|---|---|---|---|
| 7,162,204 B2 | 1/2007 | Hansen et al. | |
| 2009/0207936 A1 | 8/2009 | Behzad | |
| 2010/0085921 A1* | 4/2010 | Wu ..................... | H04L 27/2647 370/329 |
| 2010/0203854 A1 | 8/2010 | Yu et al. | |
| 2011/0211541 A1* | 9/2011 | Yuk ...................... | H04L 5/0094 370/329 |
| 2011/0222486 A1 | 9/2011 | Hart | |

(Continued)

FOREIGN PATENT DOCUMENTS

| | | |
|---|---|---|
| CN | 107409329 A | 11/2017 |
| EP | 1533910 A2 | 5/2005 |

*Primary Examiner* — Yee F Lam
(74) *Attorney, Agent, or Firm* — Conley Rose, P.C.

(57) ABSTRACT

A system of wireless communication by an access point (AP) comprising: a receiver adapted to receive a plurality of messages each originated from one of a plurality of client devices and each indicative of a spectral mask capability thereof; a processor adapted to calculate a channel assignment scheme for allocating bandwidth and/or communication channels to the plurality of client devices based on the spectral mask capability of each of the plurality of client devices; and a transmitter adapted to transmit to each of the plurality of client devices instructions to set transmission frequency based on the calculated channel assignment scheme.

20 Claims, 8 Drawing Sheets

(56) References Cited

U.S. PATENT DOCUMENTS

| | | | |
|---|---|---|---|
| 2012/0039293 A1 | 2/2012 | Feng et al. | |
| 2012/0093079 A1* | 4/2012 | Yuk | H04L 5/0091 |
| | | | 370/328 |
| 2013/0070607 A1* | 3/2013 | Sun | G01S 13/74 |
| | | | 370/241 |
| 2015/0163680 A1* | 6/2015 | Valliappan | H04L 5/0073 |
| | | | 370/329 |
| 2016/0050672 A1* | 2/2016 | Chen | H04L 1/0071 |
| | | | 370/329 |
| 2016/0073409 A1* | 3/2016 | Chen | H04L 5/0037 |
| | | | 370/329 |
| 2017/0019306 A1* | 1/2017 | Van Zelst | H04L 1/0028 |
| 2017/0359731 A1 | 12/2017 | Soldati et al. | |
| 2018/0249468 A1* | 8/2018 | Erceg | H04W 72/541 |
| 2019/0075549 A1* | 3/2019 | Yucek | H04W 72/02 |
| 2019/0327740 A1* | 10/2019 | Verma | H04W 72/0453 |
| 2020/0132829 A1* | 4/2020 | Jiang | H04W 4/40 |

\* cited by examiner

FIG. 3A "Good" Grouping

FIG. 3B "Bad" Grouping

USING ENHANCED SIGNAL SPECTRAL TX MASK FOR IMPROVED MULTI-USER GROUPING AND INCREASED SPECTRAL EFFICIENCY

CROSS-REFERENCE TO RELATED APPLICATIONS

This application is a continuation of International Patent Application No. PCT/EP2018/073740, filed on Sep. 4, 2018, the disclosure of which is hereby incorporated by reference in its entirety.

TECHNICAL FIELD

The present application, in some embodiments thereof, relates to a spectral mask and, more specifically, but not exclusively, to a dynamic spectral mask.

BACKGROUND

Figure 1:
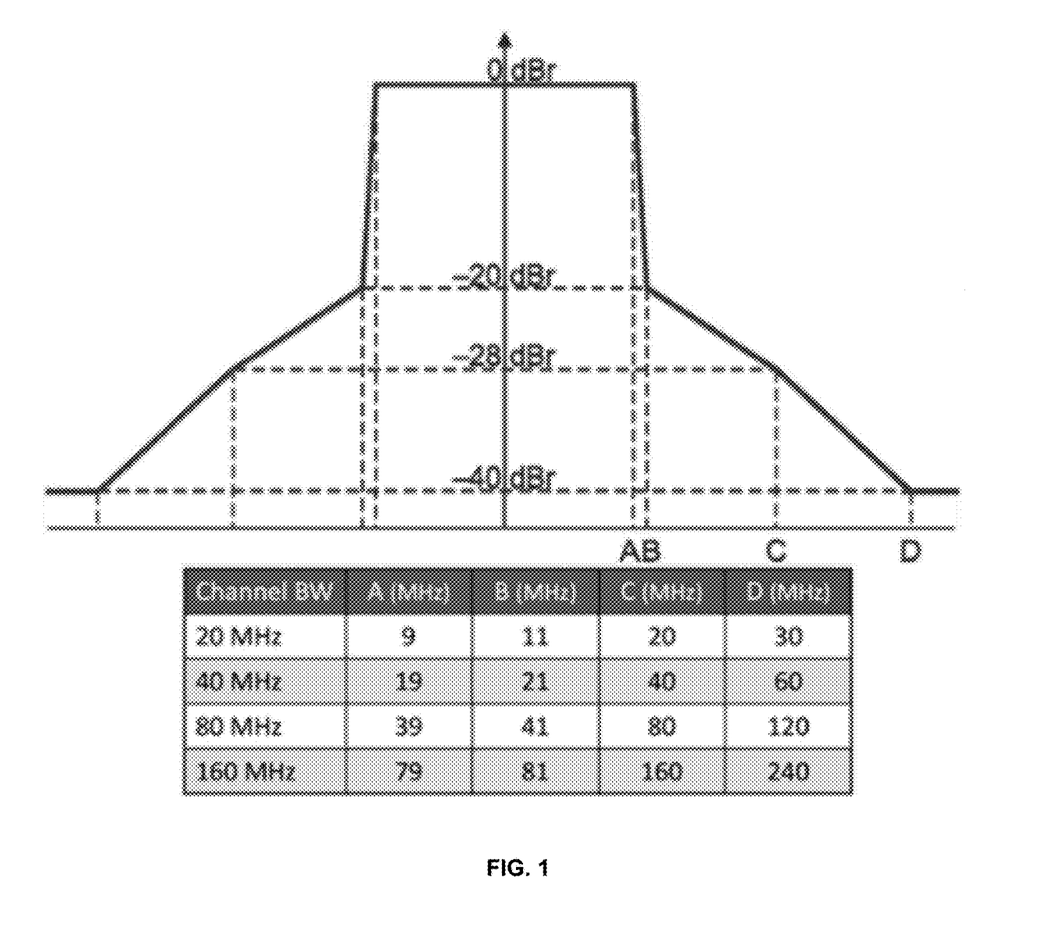
FIG. 1 is a 20 MHz transmit spectral mask defined in the 802.11 standard.

In protocols of wireless local area networks (WLANs), such as the Institute of Electrical and Electronics Engineers (IEEE) 802.11 protocol, 20 megahertz (MHz) transmit spectral mask are defined in the standard, for example as shown in FIG. 1.

Figure 2A:
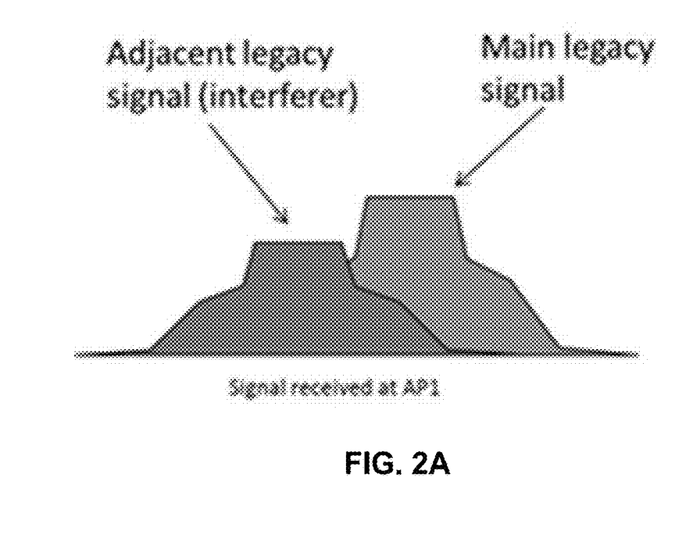
FIGS. 2A and 2B are schematic illustrations depicting adjacent signals in a current 802.11 network.
Figure 2B:
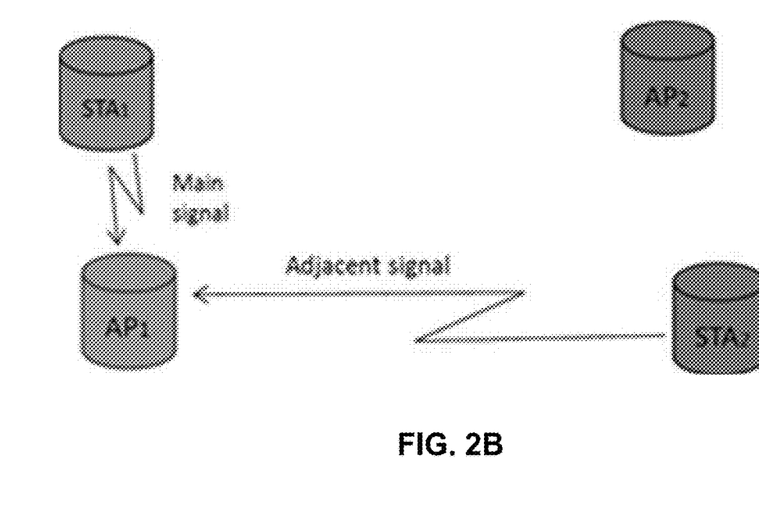

Multiple Legacy devices do not transmit simultaneously on adjacent channels to the same access point (AP). Therefore, in a simple WLAN deployment, these mask power levels are sufficient to ensure that interference caused by adjacent signal coming from another Overlapping Basic Service Set (OBSS) assumed to be far enough is negligible (see, for example, FIGS. 2A and 2B, which depict an adjacent signal in a current 802.11 network). In 802.11ax, where multiple devices may transmit to the same AP at the same time, this mask is also sufficient as long as the Receive Signal Strength Indication (RSSI) values from all devices are similar.

SUMMARY

According to a first embodiment of the present application, there is provided a system of wireless communication by an access point (AP). The system comprises: a receiver adapted to receive a plurality of messages each originated from one of a plurality of client devices and indicative of a spectral mask capability thereof; a processor adapted to calculate a channel assignment scheme for allocating bandwidth and/or communication channels to the plurality of client devices based on the spectral mask capability of each of the plurality of client devices; and a transmitter adapted to transmit to each of the plurality of client devices instructions to set transmission frequency based on the calculated channel assignment scheme.

According to a second embodiment of the present application, there is provided a method of wireless communication by an AP, the method comprising: receiving a plurality of messages each originated from one of a plurality of client devices and indicative of a spectral mask capability thereof; calculating a channel assignment scheme for allocating bandwidth and/or communication channels to the plurality of client devices based on the spectral mask capability of each of the plurality of client devices; and setting a transmission frequency of at least one of the plurality of client devices based on the calculated channel assignment scheme.

According to a third embodiment of the present application, there is provided a client device adapted for wireless communication with an AP. The client device comprises: a storage defining a number of spectral masks each limits a different distribution of signal power across each of a plurality of channels; a receiver adapted to receive from the AP instructions indicative of one of the number of spectral masks; and a transmitter adapted to transmit a message indicative of the number of spectral masks. The transmitter is adapted to apply the indicated spectral mask on a signal transmitted by the transmitter in response to receiving the instructions.

According to a fourth embodiment of the present application, there is provided a method adapted for wireless communication with an AP. The method comprises: storing a number of spectral masks each limits a different distribution of signal power across each of a plurality of channels; receiving a query message originated from the AP, transmitting a response message indicative of the number of spectral masks in response to the query; receiving instructions indicative of one of the number of spectral masks; and applying the indicated spectral mask on a signal transmitted by the transmitter in response to receiving the instructions.

When implementing any of the above embodiments, a transmission channel of one client device could be allocated adjacent to a transmission channel of client device with low-RSSI without causing interference. The system and devices also allow for allocating client devices that employ different numerologies in adjacent channels with negligible effect on the intercarrier interference (ICI) of a combined signal. When implementing the methods and systems described herein, a scheduler grouping process is more flexible and efficient, and eases its implementation and improves system capacity.

According to any of the above embodiments, the spectral mask capability defines a number of spectral masks, which are available for use by the respective client device. This allows calculating the channel assignment scheme in a more flexible manner, while taking into account the spectral mask capabilities of different client devices.

Optionally, each of the number of spectral masks has a different distribution of signal power across each of a plurality of channels. The channel assignment scheme can use these features to achieve flexible and efficient scheduling.

According to any of the above embodiments, the spectral mask capability defines whether or not the respective client device is adapted to employ more than one spectral mask. The channel assignment scheme can use these features to achieve flexible and efficient scheduling.

According to any of the above embodiments, the channel assignment scheme allocates frequencies to transmissions of the plurality of client devices such that a transmission frequency overlap therebetween is reduced. The reduction of such overlap increases the quality of the received transmissions and reduces data loss.

According to any of the above embodiments, the channel assignment scheme temporally orders transmissions of one or more client devices from the plurality of client devices which are adapted to use only a single spectral mask with transmissions of one or more other client devices from the plurality of client devices which are adapted to use a plurality of multiple spectral masks. In such a manner, the quality of transmissions received from client devices with order spectral mask capabilities is improved.

According to any of the above embodiments, the spectral mask capability is encoded in a physical layer (PHY) capabilities field, such as a capability information element (IE). This allows using an existing protocol field.

According to any of the above embodiments, the instructions are transmitted to each of the plurality of client devices in a control message. This allows using an existing protocol control message.

According to any of the above embodiments, the plurality of messages and the instructions are encoded in an orthogonal frequency-division multiple access (OFDMA) format.

Optionally, the receiver is adapted to receive a query and to respond to the query with the message.

Unless otherwise defined, all technical and/or scientific terms used herein have the same meaning as commonly understood by one of ordinary skill in the art to which the application pertains. Although methods and materials similar or equivalent to those described herein can be used in the practice or testing of embodiments of the application, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the application are herein described, by way of example only, with reference to the accompanying drawings. With reference now to the drawings in detail, it is stressed that the particulars shown are by way of example and for purposes of illustrative discussion of embodiments of the application. In this regard, the description taken with the drawings makes apparent to those skilled in the art how embodiments of the application may be practiced.

DETAILED DESCRIPTION

The present application, in some embodiments thereof, relates to a spectral mask and, more specifically, but not exclusively, to a dynamic spectral mask.

Figure 3A:
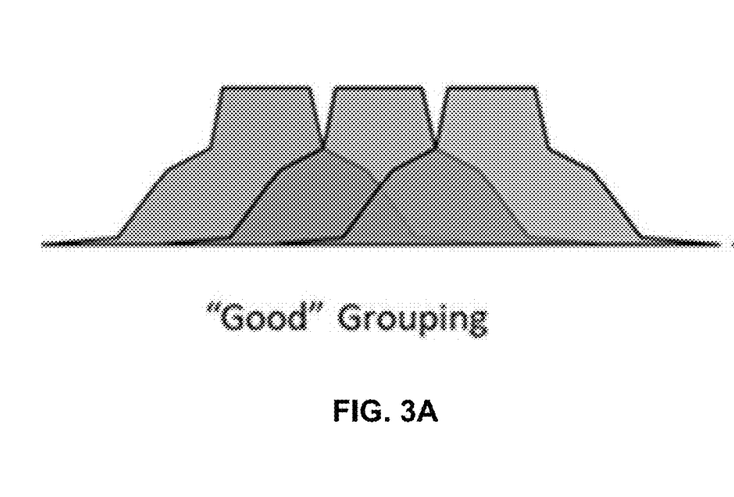
FIGS. 3A and 3B are schematic illustrations grouping of stations (STAs) with similar and non-similar RSSI respectively.
Figure 3B:
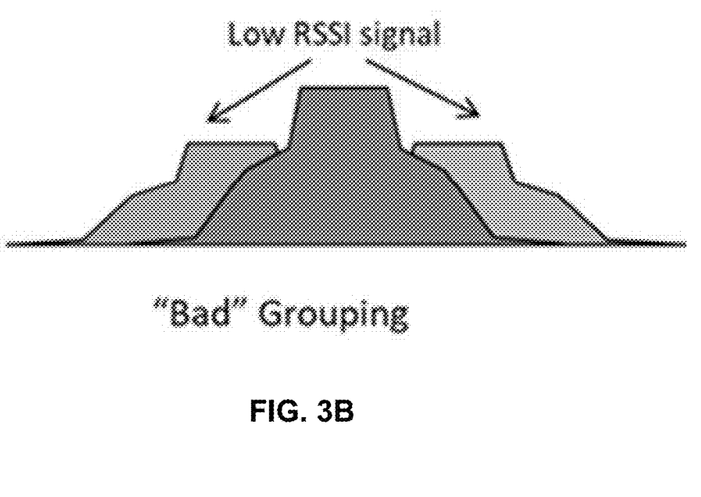

In a grouping process of stations (STAs), an AP scheduler divides associated STAs to groups according to, inter alia, their reported transmission power headroom and received RSSI where the RSSI of each STA is at the AP. Due to characteristics of a transmission (Tx) spectral mask, the AP allocates STAs that may be received with similar RSSI; otherwise low-RSSI STAs suffer interference from a high-RSSI adjacent signal as depicted in FIGS. 3A and 3B. Such restriction limits and therefore complicates the grouping process. In addition, such a restriction reduces the system efficiency, as the AP may avoid allocating STAs although there are available resources.

According to some embodiments of the present application, a channel assignment scheme for setting spectral characteristics (e.g., allocating bandwidth and/or communication channels and/or indicating which spectral masks to use) for transmission of each of a plurality of client devices dynamically calculated based on spectral mask capabilities of the stations, which are referred to herein also as client devices. This allows transmitting to each of the client devices instructions to set spectral characteristics based on the calculated channel assignment scheme for allowing higher out of band (OOB) suppression than when default Tx spectral mask(s) (the already defined mask) are used.

Optionally, a 2-phases procedure is implemented by an access point for setting the Tx spectral characteristics of each client device. In the first phase, the access point receives from each client device a message, such as a k bit (e.g., 2 bits) signaling message, which indicates whether it has dynamic spectral mask capability or not and/or the possible spectral masks it can use (e.g., a range or a set of values). Such a message could be added for example to a High-Efficiency (HE)-field (e.g., Capabilities information element=>PHY Capabilities Information field), or to an equivalent field in any standard. Optionally, the message complies with, for example, the following terms: a current Tx spectral mask specification for backward compatibility, $2^k-1$ additional options for a capability are available and the phase happens only once during the association process. In the second phase, after calculating a channel assignment scheme based on the spectral mask capabilities of the client devices, the access point transmits each of some or all of the client devices instructions for setting spectral transmission characteristic it should use based on the channel assignment scheme. For instance, a control message that is sent with the instruction is a k bit message. This phase may be repetitive on each trigger frame.

Before explaining at least one embodiment of the application in detail, it is to be understood that the application is not necessarily limited in its application to the details of construction and the arrangement of the components and/or methods set forth in the following description and/or illustrated in the drawings and/or the examples disclosed herein. The application is capable of other embodiments or of being practiced or carried out in various ways.

The present application may be a system, a method, and/or a computer program product. The computer program product may include a computer readable storage medium (or media) having computer readable program instructions thereon for causing a processor to carry out aspects of the present application.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGAs), or programmable logic arrays (PLAs) may execute the computer readable program instructions by utilizing state information of the computer readable program instructions to personalize the electronic circuitry, in order to perform aspects of the present application.

Aspects of the present application are described herein with reference to flowchart illustrations and/or block diagrams of methods, apparatus (systems), and computer program products according to embodiments of the application. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present application. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
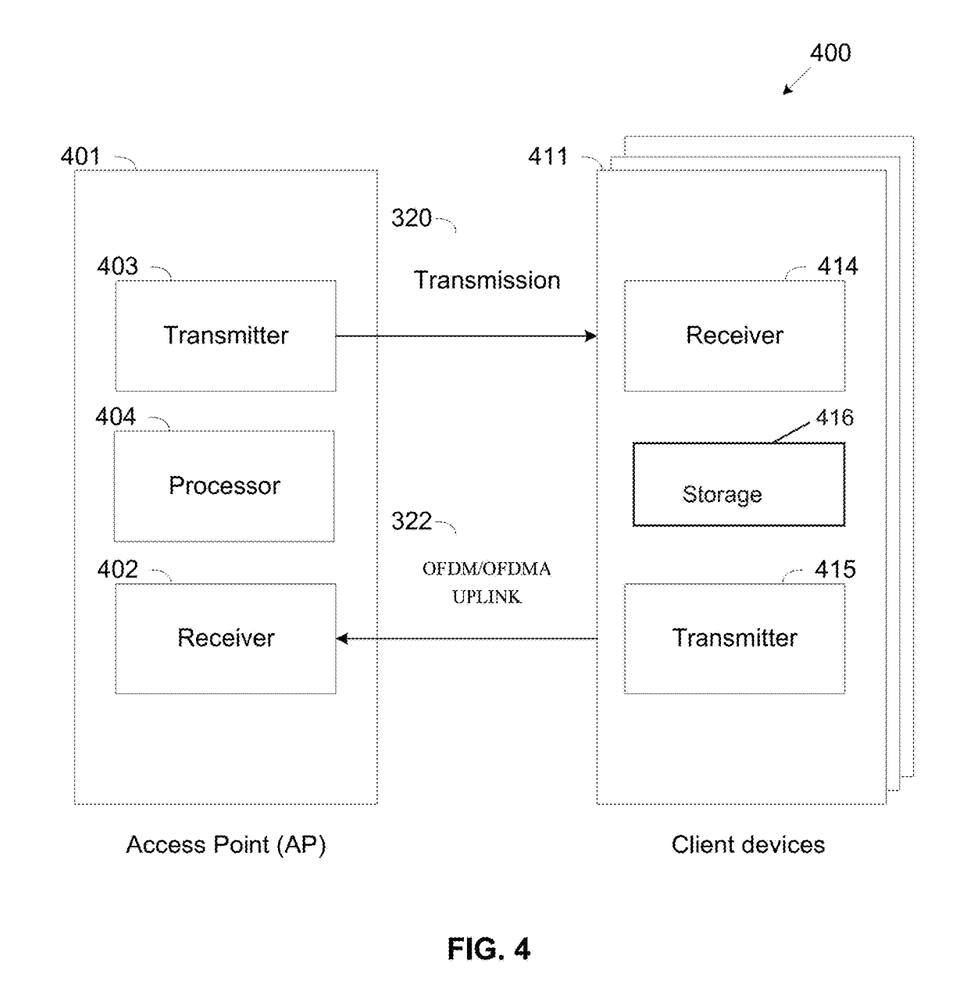
FIG. 4 is a schematic illustration of an access point and client devices, according to some embodiments of the present application.

Reference is now made to FIG. 4, which is a schematic illustration of a system 400 of wireless communication by an access point (AP) 401, according to some embodiments of the present application. The system 400, which is optionally an AP or an AP add-on, includes a receiver 402, a processor 404 and a transmitter 403.

Figure 5:
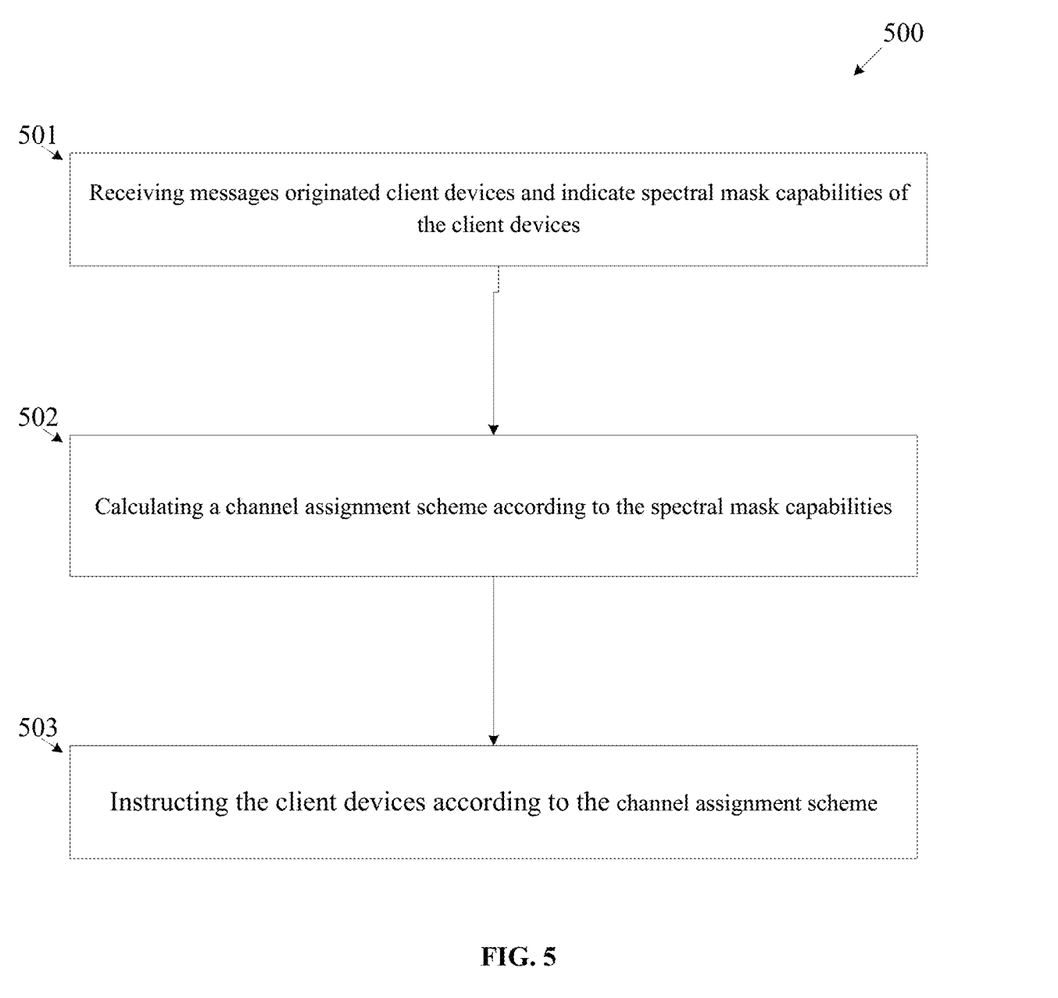
FIG. 5 is a flowchart of a process implemented by an AP to calculate, based on a spectral mask capabilities of client devices, a channel assignment scheme, and to use the channel assignment scheme to instruct multiple client devices to set spectral characteristics of transmission, according to some embodiments of the present application.

Reference is also made to FIG. 5, which is a flowchart of a process implemented by the AP 401 to calculate, based on a spectral mask capabilities of the client devices 411, a channel assignment scheme, and to use the channel assignment scheme to instruct multiple client devices to set spectral characteristics of transmission, according to some embodiments of the present application.

First, as shown at 501, the receiver 402 receives a plurality of messages each originated from one of a plurality of client devices 411, and each message includes a spectral mask capability value indicative of a spectral mask capability of the client devices. The spectral mask capability value may be a superscript indicating a number of possible phases. Each client device has a receiver 414 and a transmitter 415, and may be for instance a smartphone, a tablet, a laptop, and/or any computational unit that with wireless connectivity to a wireless local area network (WLAN). The received messages may be acquired in response to an inquiry message and/or received in a protocol message, such as Wi-Fi™ protocol message. Optionally, the spectral mask capability value is encoded in a signaling message. For example, the spectral mask capability may be encoded in a PHY Capabilities Information field of the signaling message.

The spectral mask capability value may be a binary value or a variable that provides an explicit range or options in which a spectral mask, such as a dynamic spectral mask, may be defined by the transmitting client device. Optionally, the spectral mask capability defines which spectral masks are available for use by the respective client device. Optionally, the spectral mask capability defines whether or not the respective client device is adapted to employ more than one spectral mask. Additionally or alternatively, the client device may use masks with different distribution of signal power across each of a plurality of channels.

Now, as shown at 502, the system 400 calculates a channel assignment scheme for setting spectral transmission characteristics to transmissions of the plurality of client devices 411 based on the spectral mask capabilities of the plurality of client devices 411. Optionally, the channel assignment scheme is indicative of a spectral transmission characteristics set for a transmission of each of the plurality of client devices such that transmission frequency overlap(s) therebetween is reduced. For example, the channel assignment scheme may be indicative of which spectral masks the client devices should use if they have enhanced spectral mask capabilities which allow them to use various spectral masks (e.g., by adapting the parameters of the spectral mask).

Optionally, the channel assignment scheme sets spectral transmission characteristic(s) of transmission of client devices which are adapted to use only a single spectral mask, and spectral transmission characteristics of transmission of client devices which are adapted to use more than one spectral mask.

Now as shown at 503, the transmitter 403 transmits to each of the plurality of client devices 411 instructions to set spectral transmission characteristic(s) based on the calculated channel assignment scheme, for example which spectral mask to use. Optionally, the instructions are transmitted to each of the plurality of client devices 14 in a control message. Optionally, the instructions are encoded in an o (OFDMA) format.

Figure 6:
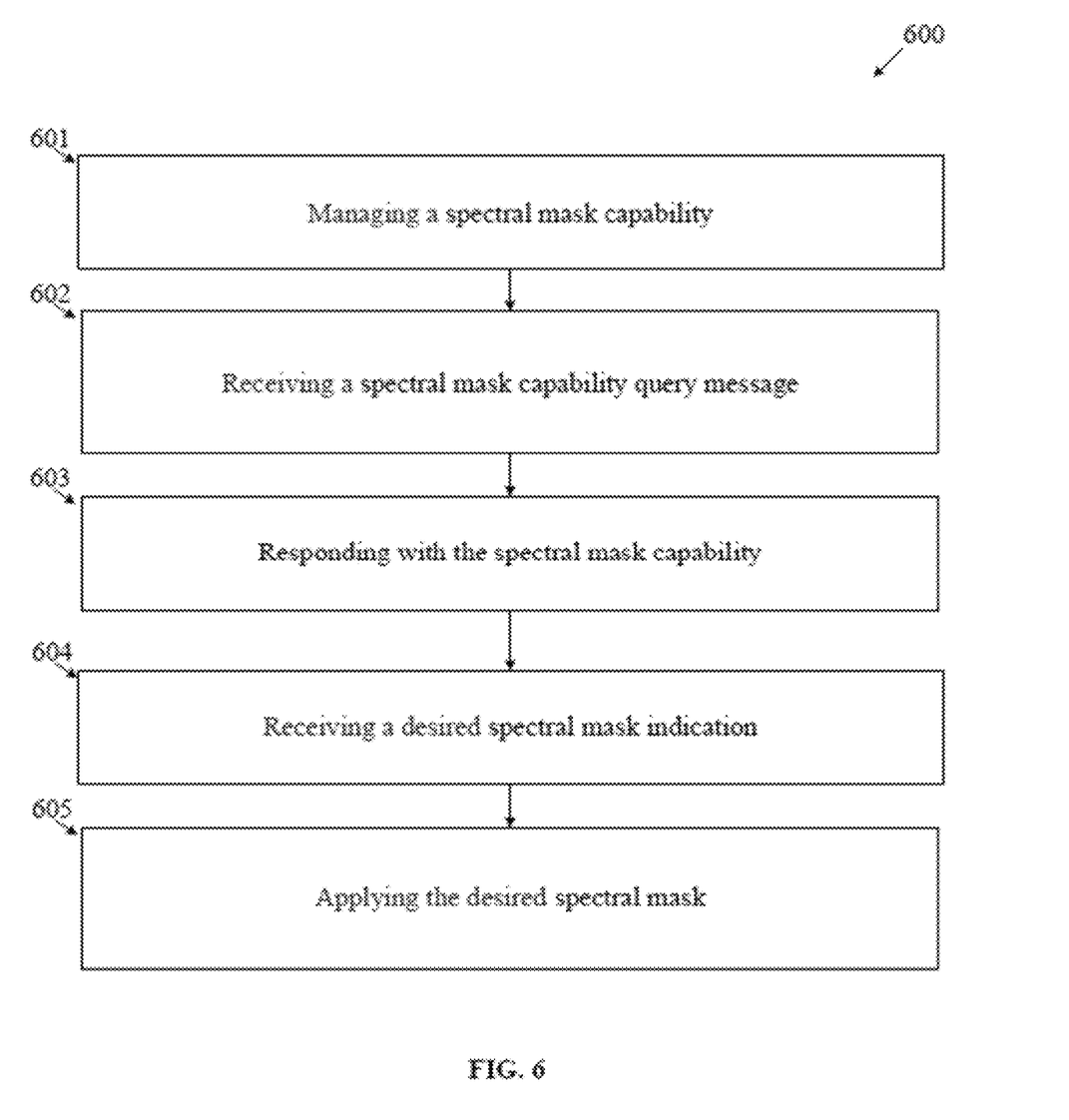
FIG. 6 is a flowchart of a process implemented by a client device to provide an AP with spectral mask capability data for allowing the AP to implement the method depicted in FIG. 5, according to some embodiments of the present application.
Figure 7:
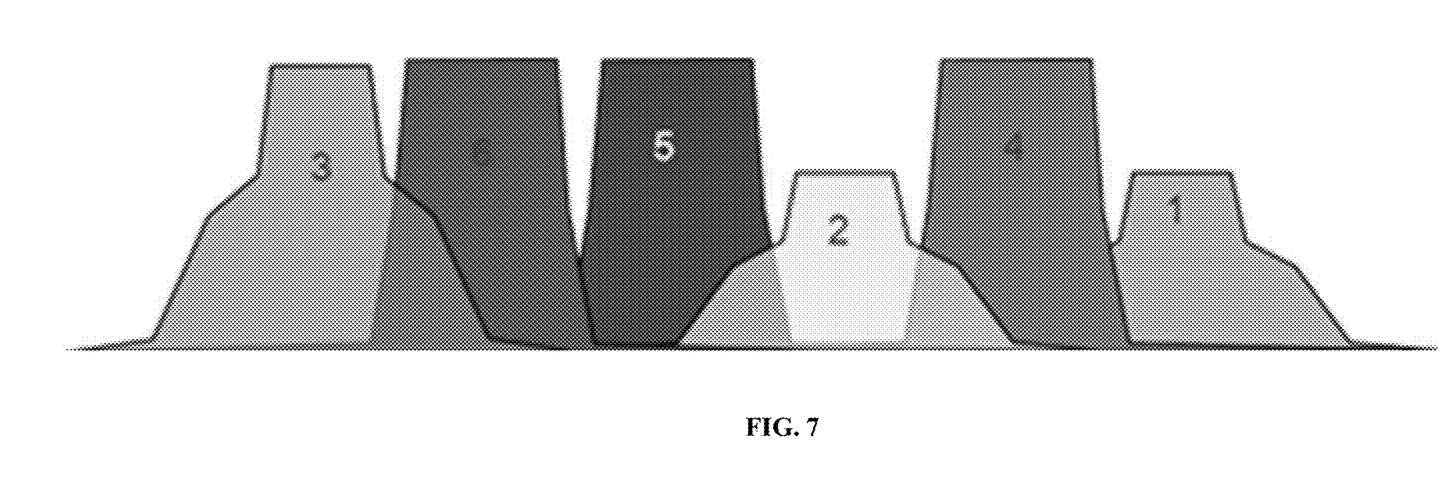
FIG. 7 is a schematic illustration of spectral masks used by different client devices based on a channel assignment scheme calculated as described with reference to FIGS. 4-6, according to some embodiments of the present application.

Reference is now made for example to FIG. 7, which is a schematic illustration of spectral masks set according to a channel assignment scheme calculated for six different client devices as described above with reference to FIGS. 4-6, according to some embodiments of the present application. In this example, the spectral mask capability value is set such that $k^1=0$ to denote a default spectral mask transmission capability only and $k^1 \neq 0$ to denote enhanced spectral mask transmission capability. In this example, each of client devices 1 to 3 supports only a default mask so the AP 401 receives from each one of them a message encoding $k^1=0$ as a spectral mask capability value, for instance in the PHY capability info field. In this example, each of client devices 4 to 6 supports an enhanced mask so the AP 401 receives from each one of them a message encoding $k^1 \neq 0,1$ (e.g., $k^1=1$ or $k^1=2$), as a spectral mask capability value, for instance in the PHY capability info field. In this example, client devices 1 to 2 are RSSI limited, therefore only the channel assignment scheme is set such that client devices with an enhanced spectral mask are located adjacent to them. The channel assignment scheme sets the transmission of client devices 4 and 5 as depicted in FIG. 5. In use, client devices 4 and 5 are notified, for example as described above (e.g., in a trigger frame such as a Physical Layer Convergence Procedure (PLCP) Protocol Data Unit (PPDU)) to use the enhanced mask in order to set spectral characteristics to client 1 and 2 as described herein. In this example, client devices 1, 2, and 3 use a default spectral mask, while client device 6 in this example may use either the default mask or the enhanced mask and the channel assignment scheme may set instructions for client device 6 according to other considerations such as a required transmit error vector magnitude (Tx-EVM) of the client device. When the Tx-EVM is required to be low (for example when data rate is relatively high), the default mask shall be chosen as an enhanced mask is more likely to increase the Tx-EVM.

As indicated above, according to some embodiments of the present application there is a client device, such as one of the client devices 411 in FIG. 4. The client device 411 is adapted for wireless communication with an AP, such as the AP 401 in FIG. 4. The client device 411, optionally an STA, includes a storage 416 with logic or instructions to define a number of spectral masks, where each limits a different distribution of signal power across each of a plurality of wireless channels or instructions to define a dynamic a spectral mask in order to limit the distribution of the signal power across each of the wireless channels. The client device 411 further includes the receiver 414 to receive a message, such as a query message, originated from the AP and instructions indicative of one of the spectral masks or instructions indicative of how to adapt the dynamic spectral mask. The client device 411 further includes the transmitter 415 for transmitting a response message indicative of the available spectral masks in response to the query message and/or not in response to the query message, for instance periodically, randomly, and/or based on various parameters. The transmitter is adapted to apply the indicated spectral mask on a signal transmitted by the transmitter in response to receiving the instructions in order to reduce transmission frequency overlap between the transmissions of different client devices communicating with the AP.

FIG. 6 is of a process 600 implemented by a client device (such as one of the client devices 411 in FIG. 4) for providing an AP (such as the AP 401 in FIG. 4) with spectral mask capability data for allowing the AP to implement the method depicted in FIG. 5, according to some embodiments of the present application. First, as shown at 601, a spectral mask capability to dynamically limit a distribution of signal power across a plurality of channels is managed, for example stored in the memory 416 as a number of spectral masks which are available to the client device or as possible instructions to adapt a dynamic mask by the client device. Now, as shown at 602, a query message originated from an AP is received. Now, as shown at 603, a response message indicative of the number of spectral masks which are available for usage by the client device is transmitted by the client device to the AP. Optionally, the response message may be transmitted in response to the query message or not in response to the query message, for instance periodically, randomly, and/or based on various parameters. Now, as shown at 604, after the response message is received by the AP, the client device receives instructions indicative of a desired spectral mask to use and based on the information the client device provided. This allows the client device, as shown at 605 and described above, to apply the indicated spectral mask on signal(s) transmitted by the transmitter 415 after the instructions are received.

Figure 8A:
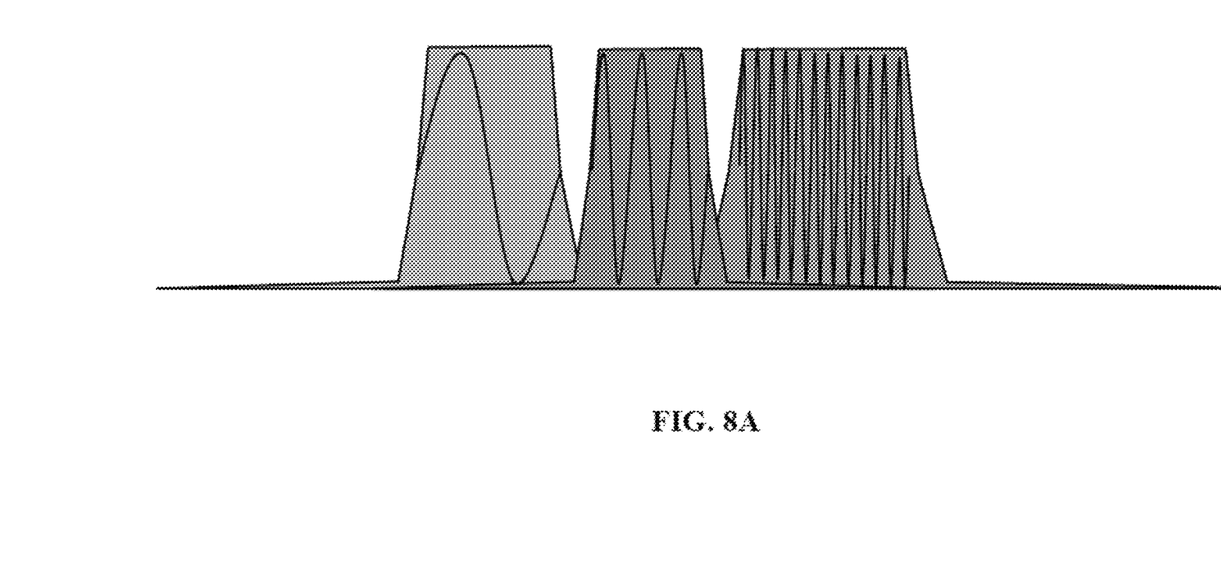
FIGS. 8A and 8B are respectively schematic illustrations of spectral masks of client devices allocated to employ different numerologies in adjacent channels with negligible effect on the ICI of a combined signal and spectral masks allocated to adjacent transmission channels of client devices with low-RSSI without interference, according to some embodiments of the present application.
Figure 8B:
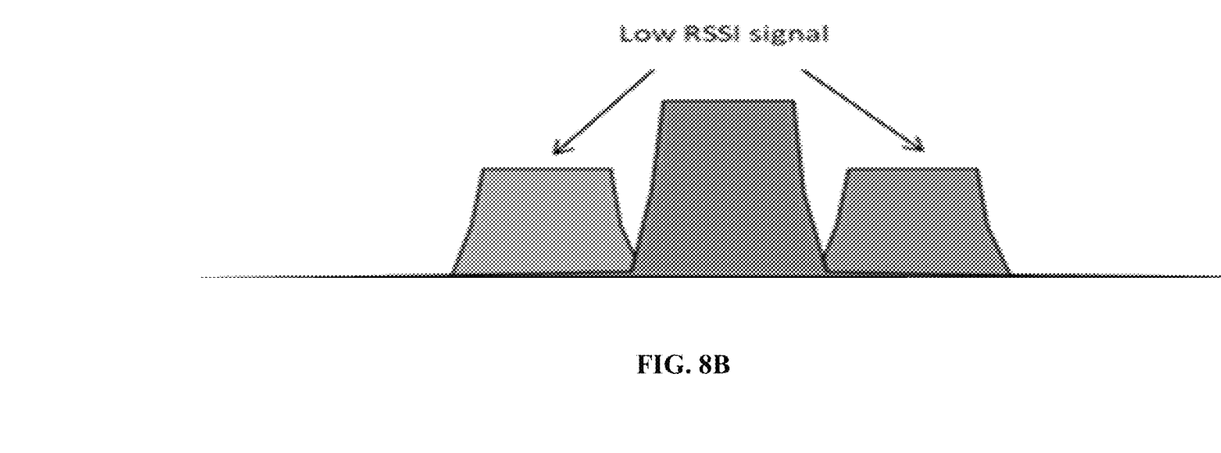

When implementing the methods and systems described herein, a transmission channel of one client device could be allocated adjacent to a transmission channel of another client device with low-RSSI without causing interference, for example as depicted in FIG. 8B. The system and devices also allow for allocating client devices that employ different numerologies in adjacent channels with negligible effect on the inter carrier interference (ICI) of a combined signal, for example see FIG. 8A.

When implementing the methods and systems described herein, a scheduler grouping process is more flexible and efficient, and eases its implementation and improves system capacity.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present application have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a transmitter, a receiver, AP, STA, client device, a processor, and a communication is intended to include all such new technologies a priori.

As used herein the term "about" refers to ±10%.

The terms "comprises", "comprising", "includes", "including", "having" and their conjugates mean "including but not limited to". These terms encompass the phrases "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance, or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the application may include a plurality of "optional" features unless such features conflict.

Throughout this application, various embodiments of this application may be presented in a range format. It should be understood that the description in range format is merely for convenience and brevity and should not be construed as an inflexible limitation on the scope of the application. Accordingly, the description of a range should be considered to include all the possible subranges as well as individual numerical values within that range. For example, description of a range such as from 1 to 6 should be considered to include subranges such as from 1 to 3, from 1 to 4, from 1 to 5, from 2 to 4, from 2 to 6, from 3 to 6, etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the application, which are, for clarity, described in the context of separate embodiments, may also be provided in combination in a single embodiment. Conversely, various features of the application, which are, for brevity, described in the context of a single embodiment, may also be provided separately or in any suitable sub-combination or as suitable in any other described embodiment of the application. Certain features described in the context of various embodiments are not to be considered essential features of those embodiments, unless the embodiment is inoperative without those elements.

All publications, patents, and patent applications mentioned in this specification are herein incorporated in their entirety by reference into the specification, to the same extent as if each individual publication, patent, or patent application was specifically and individually indicated to be incorporated herein by reference. In addition, citation or identification of any reference in this application shall not be construed as an admission that such reference is available to negate patentability of the present application. To the extent that section headings are used, they should not be construed as necessarily limiting.

What is claimed is:

1. An apparatus, comprising:
    a memory configured to store instructions; and
    one or more processors coupled to the memory and configured to:
        establish wireless local area network (WLAN) connections between the apparatus and a plurality of client devices;
        receive, through the WLAN connections and from the plurality of client devices, a plurality of messages, wherein each message of the plurality of messages indicates a spectral mask capability of one of the plurality of client devices;
        calculate, based on the spectral mask capability of each of the plurality of client devices, a channel assignment scheme for allocating bandwidth or communication channels within a WLAN of the apparatus and the plurality of client devices to the plurality of client devices; and
        transmit, through the WLAN connections and to each of the plurality of client devices, instructions to set a transmission frequency based on the channel assignment scheme.

2. The apparatus of claim 1, wherein the spectral mask capability defines a number of spectral masks available for use by each of the plurality of client devices.

3. The apparatus of claim 2, wherein each of the number of spectral masks has a different distribution of signal power across each of a plurality of channels.

4. The apparatus of claim 1, wherein the spectral mask capability defines whether or not each of the plurality of client devices is configured to employ more than one spectral mask.

5. The apparatus of claim 1, wherein the channel assignment scheme allocates frequencies for transmissions of the plurality of client devices such that a transmission frequency overlap therebetween is reduced.

6. The apparatus of claim 1, wherein the channel assignment scheme temporally schedules transmissions of one or more client devices from the plurality of client devices that are configured to use only a single spectral mask with other transmissions of one or more other client devices from the plurality of client devices that are configured to use a plurality of spectral masks.

7. The apparatus of claim 1, wherein each of the plurality of client devices has a different received signal strength indication (RSSI).

8. The apparatus of claim 1, wherein the spectral mask capability is encoded in a physical layer (PHY) capability information field.

9. The apparatus of claim 1, wherein the instructions are transmitted to each of the plurality of client devices in a control message.

10. The apparatus of claim 1, wherein the plurality of messages and the instructions are encoded in an orthogonal frequency-division multiple access (OFDMA) format.

11. The apparatus of claim 1, wherein the plurality of messages comprises WI-FI protocol messages.

12. A method, comprising:
    establishing wireless local area network (WLAN) connections between an access point (AP) and a plurality of client devices;
    receiving, through the WLAN connections and from the plurality of client devices, a plurality of messages, wherein each of the plurality of messages indicates a spectral mask capability of one of the plurality of client devices;
    calculating, based on the spectral mask capability of each of the plurality of client devices, a channel assignment scheme for allocating bandwidth or communication channels with a WLAN of the AP and the plurality of client devices to the plurality of client devices; and transmitting, through the WLAN connections and to each of the plurality of client devices, instructions to set a transmission frequency based on the channel assignment scheme.

13. The method of claim 12, wherein the spectral mask capability defines a number of spectral masks available for use by each of the plurality of client devices.

14. The method of claim 13, wherein each of the number of spectral masks has a different distribution of signal power across each of a plurality of channels.

15. The method of claim 12, wherein the spectral mask capability defines whether or not each of the plurality of client devices is configured to employ more than one spectral mask.

16. The method of claim 12, wherein the channel assignment scheme allocates frequencies for transmissions of the plurality of client devices such that a transmission frequency overlap therebetween is reduced.

17. The method of claim 12, wherein the channel assignment scheme temporally schedules transmissions of one or more client devices from the plurality of client devices that are configured to use only a single spectral mask with other transmissions of one or more other client devices from the plurality of client devices that are configured to use a plurality of spectral masks.

18. The method of claim 12, wherein each of the plurality of client devices has a different received signal strength indication (RSSI).

19. The method of claim 12, wherein the spectral mask capability is encoded in one of:
  a physical layer (PHY) capability information field; or
  an orthogonal frequency-division multiple access (OFDMA) format.

20. A computer program product comprising instructions stored on a non-transitory computer-readable medium that, when executed by one or more processors, cause an apparatus to:
  establish wireless local area network (WLAN) connections between the apparatus and a plurality of client devices;
  receive, through the WLAN connections and from the plurality of client devices, a plurality of messages, wherein each message of the plurality of messages indicates a spectral mask capability of one of the plurality of client devices;
  calculate, based on the spectral mask capability of each of the plurality of client devices, a channel assignment scheme for allocating bandwidth or communication channels within a WLAN of the apparatus and the plurality of client devices to the plurality of client devices; and
  transmit, through the WLAN connections and to each of the plurality of client devices, instructions to set a transmission frequency based on the channel assignment scheme.

* * * * *